US012804433B2

(12) United States Patent
Kwon et al.

(10) Patent No.: US 12,804,433 B2
(45) Date of Patent: Nov. 17, 2026

(54) APPARATUS AND METHOD FOR INTELLIGENCE BEAM MANAGEMENT OPERATION IN WIRELESS COMMUNICATION SYSTEM

(71) Applicant: ELECTRONICS AND TELECOMMUNICATIONS RESEARCH INSTITUTE, Daejeon (KR)

(72) Inventors: Yong Jin Kwon, Daejeon (KR); An Seok Lee, Daejeon (KR); Hee Soo Lee, Daejeon (KR); Seung Jae Bahng, Daejeon (KR); Yun Joo Kim, Daejeon (KR); Hyun Seo Park, Daejeon (KR); Jung Bo Son, Daejeon (KR); Yu Ro Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 279 days.

(21) Appl. No.: 18/742,419

(22) Filed: Jun. 13, 2024

(65) Prior Publication Data

US 2024/0422595 A1 Dec. 19, 2024

(30) Foreign Application Priority Data

Jun. 13, 2023 (KR) ........................ 10-2023-0075471
Jun. 12, 2024 (KR) ........................ 10-2024-0076305

(51) Int. Cl.
*H04W 24/08* (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS 8,406,775 B2 3/2013 Ahn et al.
9,426,668 B2 8/2016 Shin et al.
10,666,342 B1 5/2020 Landis et al.
2025/0254558 A1 * 8/2025 Cao .................... H04W 72/231
2025/0301349 A1 * 9/2025 Cao ....................... H04W 24/08
2025/0379634 A1 * 12/2025 Guan ................ H04B 7/06952
(Continued)

FOREIGN PATENT DOCUMENTS

WO WO-2024164328 A1 * 8/2024 ......... H04B 7/06952

*Primary Examiner* — Peter P Chau

(57) ABSTRACT

Proposed are an apparatus and a method for an intelligence beam management operation in a wireless communication system. An operation method of a user equipment (UE) in a wireless communication system includes receiving, from a base station (BS), configuration of a measurement set including beam entirety information of the base station used in beam measurement, receiving information on beam measurement from the base station, predicting the measurement set on the basis of the information on beam measurement, transmitting information on a recommended measurement set or a restricted measurement set to the base station, the information on the recommended measurement set and the restricted measurement set being in a bitmap form, and receiving a beam measurement result based on a modified measurement set from the base station.

17 Claims, 13 Drawing Sheets

(56) References Cited

U.S. PATENT DOCUMENTS

| | | | | |
|---|---|---|---|---|
| 2026/0025180 | A1* | 1/2026 | Li | H04B 7/0626 |
| 2026/0058880 | A1* | 2/2026 | Li | H04B 7/06952 |
| 2026/0067717 | A1* | 3/2026 | Rydén | H04B 7/06952 |

* cited by examiner

APPARATUS AND METHOD FOR INTELLIGENCE BEAM MANAGEMENT OPERATION IN WIRELESS COMMUNICATION SYSTEM

CROSS REFERENCE TO RELATED APPLICATION

The present application claims priority to Korean Patent Application No. 10-2023-0075471, filed 13 Jun. 2023, and 10-2024-0076305, filed on Jun. 12, 2024, the entire contents of which is incorporated herein for all purposes by this reference.

BACKGROUND OF THE INVENTION

Field of the Invention

The present disclosure relates generally to a wireless communication system. More particularly, the present disclosure relates to an apparatus and a method for an intelligence beam management operation in a wireless communication system.

Description of the Related Art

As a frequency band used in a cellular wireless communication system has increased, cellular wireless communication systems have come to use a frequency band in the millimeter wave (mmWave) band (e.g., 30 GHz to 300 GHz). Using a high frequency band reduces the reach of a signal due to a shorter wavelength and greater path attenuation. One method to solve this is to use an antenna technology to create a directional beam that directs a signal to a particular area to improve reach. Directional beams focus transmission power in different areas to achieve the coverage of a user equipment at a greater distance. However, in order to secure stable link performance when using such directional beams, a process of selecting a base station beam (Tx beam) and a user equipment beam (Rx beam) that will show the optimal performance of a base station and a user equipment among multiple beans is additionally required. To this end, a beam management process including P1, P2, and/or P3 processes has been introduced in 5G new radio (NR).

For optimal beam selection in the beam management process, it is necessary to obtain measurement results for all available beams, or perform result measurement for multiple beams depending on an implementation method of a base station or a user equipment and select an optimal beam on the basis of the result measurement. However, this process of finding an optimal beam incurs overhead, and the frequent occurrence of overhead leads to performance degradation and user equipment power consumption. To overcome this program, an intelligent (AI/ML) technology may be introduced into the beam management process. The beam management technology using the intelligent technology aims to reduce overhead used in conventional beam measurement while maintaining accuracy.

In 3GPP Release 18 (Rel-18), a technology that uses the intelligent technology to improve a wireless environment has been discussed. In particular, discussions on how to improve the beam management process have been conducted as a key use case in "AI/ML for NR Air Interface", which is the study item (SI) of Rel-18.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing an apparatus and a method for an intelligence beam management operation in a wireless communication system.

In addition, the present disclosure is directed to providing an apparatus and a method for a measurement beam set selection process to avoid overhead due to unnecessary beam measurement in a wireless communication system.

In addition, the present disclosure is directed to providing an apparatus and a method for a base station and a user equipment to select a base station beam measurement set and exchange information in a wireless communication system.

In addition, the present disclosure is directed to providing an apparatus and a method for operating in a wireless communication system, wherein a process of setting a measurement beam set is included in an intelligent beam management technology.

According to various embodiments of the present disclosure, there is provided an operation method of a user equipment (UE) in a wireless communication system, the operation method including: receiving, from a base station (BS), configuration of a measurement set including beam entirety information of the base station used in beam measurement; receiving information on beam measurement from the base station; predicting the measurement set on the basis of the information on beam measurement; transmitting information on a recommended measurement set or a restricted measurement set to the base station, the information on the recommended measurement set and the restricted measurement set being in a bitmap form; and receiving a beam measurement result based on a modified measurement set from the base station.

According to various embodiments of the present disclosure, there is provided an operation method of a base station (BS) in a wireless communication system, the operation method including: transmitting, to a user equipment (UE), configuration of a measurement set including beam entirety information of the base station used in beam measurement; transmitting, to the user equipment, information on beam measurement on the basis of the measurement set used in a beam management operation performed at a previous time; receiving, from the user equipment, information on a recommended measurement set or a restricted measurement set on the basis of the information on beam measurement, the information on the recommended measurement set and the restricted measurement set being in a bitmap form; determining, on the basis of the information on the recommended measurement set or the restricted measurement set, a beam measurement set to be used in future beam measurement; and transmitting a beam measurement result based on the determined measurement set to the user equipment.

According to various embodiments of the present disclosure, there is provided a user equipment (UE) in a wireless communication system, the user equipment including: at least one transceiver; and at least one controller operably connected to the at least one transceiver, wherein the at least one controller is configured to receive, from a base station (BS), configuration of a measurement set including beam entirety information of the base station used in beam measurement; receive information on beam measurement from the base station; predict the measurement set on the basis of the information on beam measurement; transmit information on a recommended measurement set or a restricted measurement set to the base station, the information on the recommended measurement set and the restricted measurement set being in a bitmap form; and receive a beam measurement result based on a modified measurement set from the base station.

According to various embodiments of the present disclosure, there is provided a base station (BS) in a wireless communication system, the base station including: at least one transceiver; and at least one controller operably connected to the at least one transceiver, wherein the at least one controller is configured to transmit, to a user equipment (UE), configuration of a measurement set including beam entirety information of the base station used in beam measurement; transmit, to the user equipment, information on beam measurement on the basis of the measurement set used in a beam management operation performed at a previous time; receive, from the user equipment, information on a recommended measurement set or a restricted measurement set on the basis of the information on beam measurement, the information on the recommended measurement set and the restricted measurement set being in a bitmap form; determine, on the basis of the information on the recommended measurement set or the restricted measurement set, a beam measurement set to be used in future beam measurement; and transmit a beam measurement result based on the determined measurement set to the user equipment.

The apparatus and the method according to various embodiments of the present disclosure use an intelligent beam management technology in a wireless communication system, so that a measurement set for reducing overhead occurring in a beam selection process is set to increase transmission efficiency through optimal beam selection.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The terms used in the present disclosure are merely used to describe a particular embodiment, and are not intended to limit the scope of another embodiment. An expression used in the singular encompasses the expression of the plural, unless it has a clearly different meaning in the context. All the terms including technical and scientific terms used herein have the same meaning as commonly understood by those skilled in the art to which the present disclosure belongs. Among the terms used in the present disclosure, the terms defined in a general dictionary may be interpreted to have the meanings the same as or similar to the contextual meanings in the relevant art, and are not to be interpreted to have ideal or excessively formal meanings unless explicitly defined in the present disclosure. In some cases, even the terms defined in the present disclosure should not be interpreted to exclude the embodiments of the present disclosure.

In various embodiments of the present disclosure to be described below, a hardware approach will be described as an example. However, the various embodiments of the present disclosure include a technology using both hardware and software, so the various embodiments of the present disclosure do not exclude a software-based approach.

In addition, in the detailed description and claims of the present disclosure, the expression "at least one of A, B, and C" mean "only A", "only B", "only C", or "any combination of A, B, and C". In addition, the expression "at least one of A, B, or C" or "at least one of A, B, and/or C" may mean "at least one of A, B, and C".

Hereinafter, the present disclosure relates to an apparatus and a method for an intelligence beam management operation in a wireless communication system. Specifically, the present disclosure describes a technology for intelligent beam selection including measurement beam selection in a beam management process of a base station and a user equipment in a wireless communication system.

The terms referring to signals, the terms referring to channels, the terms referring to control information, the terms referring to network entities, the terms referring to elements of an apparatus, and the like used in the description below are only examples for the convenience of description.

Accordingly, the present disclosure is not limited to the terms described below, and the terms may be replaced by other terms having the same technical meanings.

In addition, various embodiments of the present disclosure are described using terms used in some communication standards (e.g., the 3rd Generation Partnership Project (3GPP)), but the embodiments are only examples for the description. The various embodiments of the present disclosure may be easily modified and applied to other communication systems.

Figure 1:
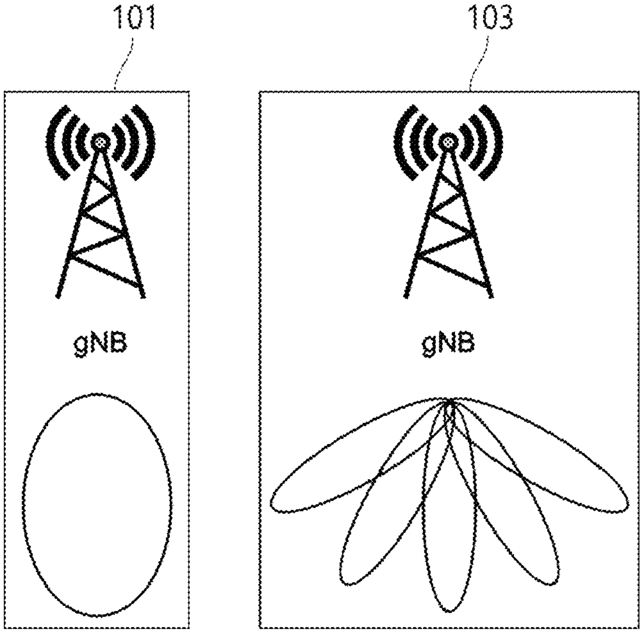
FIG. 1 shows an example of non-directional beams and directional beams according to various embodiments of the present disclosure.

FIG. 1 shows an example of non-directional beams and directional beams according to various embodiments of the present disclosure. In FIG. 1, a gNB may be a base station of a 5G network.

Referring to FIG. 1, the box 101 shows an example of non-directional beams, and the box 103 shows an example of directional beams.

The elliptical shape in the box 101 may show the emission pattern of non-directional beams. Therefore, the elliptical shape may mean that non-directional beams of the base station are emitted evenly in all directions.

The several elliptical shapes in box 103 may show the emission pattern of directional beams. Therefore, the several elliptical shapes may mean that directional beams of the base station are emitted more in particular directions and emitted less in other directions.

That is, non-directional beams transmit signals evenly in all directions, but directional beams transmit strong signals in particular directions to increase signal strength for a longer distance or a particular area.

Figure 2:
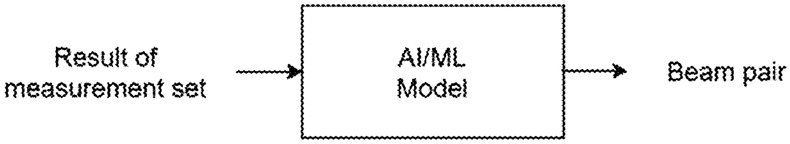
FIG. 2 shows a schematic diagram of an intelligent beam management technology according to an embodiment of the present disclosure.

FIG. 2 shows a schematic diagram of an intelligent beam management technology according to an embodiment of the present disclosure.

Referring to FIG. 2, an inference process using an intelligent beam management technology may include a process of measuring the performance of a particular beam in order to select an optimal beam. According to an embodiment, the performance of a particular beam may include L1-RSRP (Reference Signal Received Power) or L1-SINR (signal-to-interference-plus-noise ratio) measured by a user equipment.

The measured beam performance may be input to an intelligent model (AI/ML model) and used to obtain a result (output) in an inference process. A result value of the intelligent model may be an index of a beam having the optimal performance or the performance (e.g., L1-RSRP) of all available beams. An important part of a beam performance measurement process is determining a base station beam or a beam pair (including both a base station beam and a user equipment beam) used to perform performance measurement. Using an exhaustive search method of obtaining measurement results for all base station beams or beam pairs may determine a base station beam or a beam pair that provides optimal performance in any state, but causes a waste of overhead in the measurement process.

In general, a resource used in the beam performance measurement process is the synchronization signal block (SSB) or the Channel State Information Reference Signal (CSI-RS), and beam performance measurement is performed by transmitting a predetermined reference signal. To strike a balance between the overhead of the measurement process the performance with a finally selected beam, it is essential to reduce performance measurement for unnecessary beams. As such, the intelligent model for beam selection may exist independently at the base station or the user equipment.

The existence of the intelligent model at the base station may additionally require a process of forwarding beam performance information measured by the user equipment to the base station and using the information as input to the intelligent model.

In the present disclosure, a set of beams with which performance measurement is performed for a beam selection process is defined as a measurement set. A method of configuring the measurement set may be important to perform an intelligent beam selection process.

Figure 3:
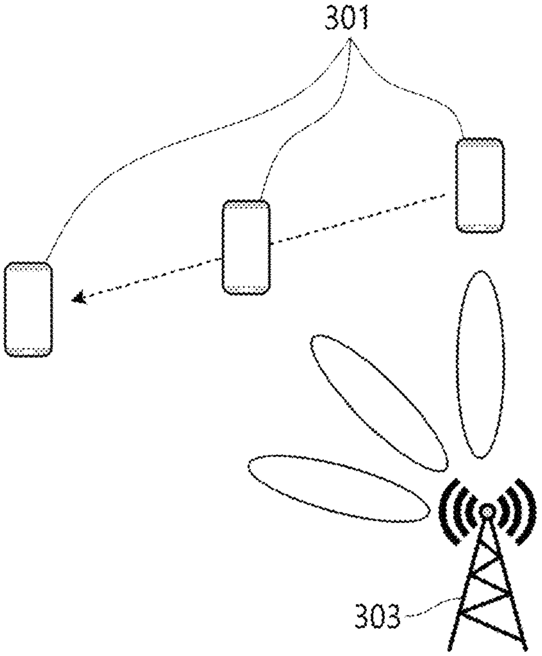
FIG. 3 shows an example of a state in which beam change is required according to an embodiment of the present disclosure.

FIG. 3 shows an example of a state in which beam change is required according to an embodiment of the present disclosure.

Referring to FIG. 3, FIG. 3 shows a state in which a user equipment 301 is moving in the arrow direction as shown in FIG. 3. While the user equipment 301 is moving, the user equipment 301 and a base station 303 continuously perform a beam management operation for finding an optimal base station beam or beam pair. In this process, when the intelligent beam management technology is located at the user equipment 301, the user equipment 301 may predict a base station measurement set configuration (pattern) that requires measurement at the next point in time and may use the configuration in the inference process.

When the intelligent beam management technology is located at the base station 303, measurement information may be forwarded from the user equipment 301 and the user equipment 301 or the base station 303 may predict the base station measurement set configuration that requires measurement at the next point in time and may use the configuration in the inference process.

Figure 4:
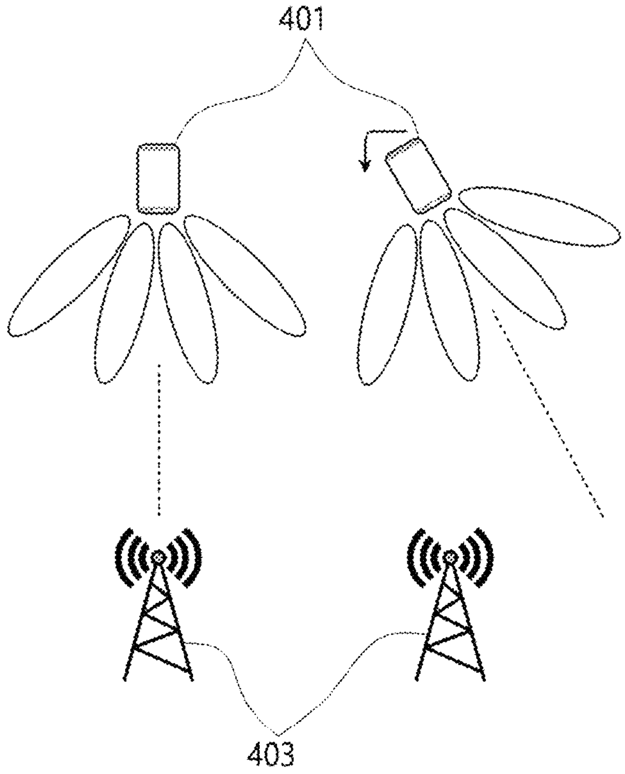
FIG. 4 shows another example of a state in which beam change is required according to an embodiment of the present disclosure.

FIG. 4 shows another example of a state in which beam change is required according to an embodiment of the present disclosure.

Referring to FIG. 4, unlike FIG. 3, in some cases, the location of a user equipment 401 is similar and only the orientation of the user equipment 301 is different. The user equipment 401 may change its orientation with respect to the base station 403 depending on the current state of the user, and a user equipment beam that the user equipment 401 best recommends may change accordingly.

When the user equipment beam changes, a base station beam that the user equipment 401 recommends for performing measurement may also change accordingly. The user equipment 401 may forward the information to the base station 403 for use.

Figure 5:
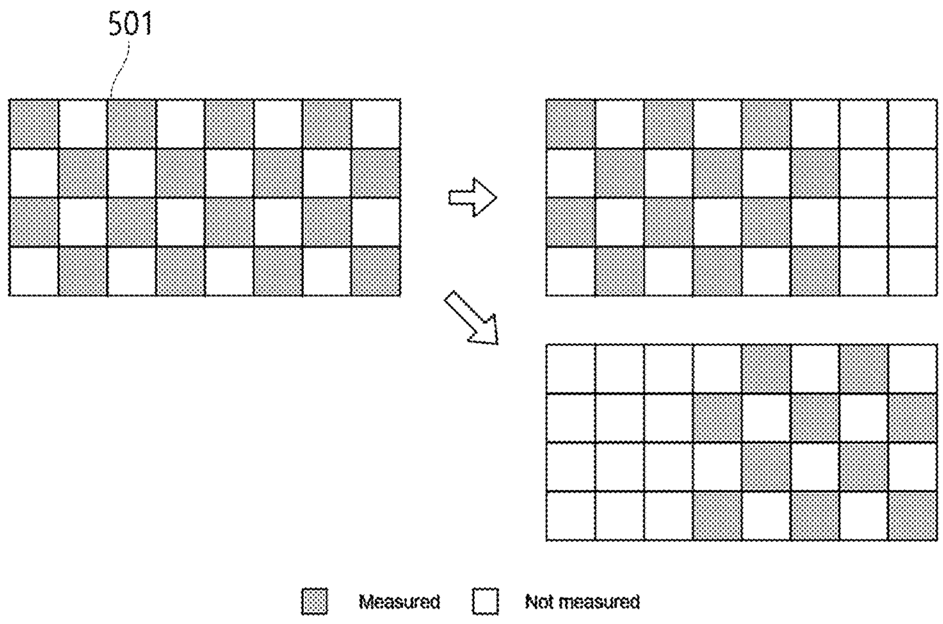
FIG. 5 shows an example of changing a base station beam set according to an embodiment of the present disclosure.

FIG. 5 shows an example of changing a base station beam set according to an embodiment of the present disclosure.

Referring to FIG. 5, in order to determine a measurement set used in an intelligent beam management process within a particular period of time regardless of whether a user equipment is moving as shown in FIG. 3 or 4, a process for a user equipment to forward, to a base station, information for a measurement set used in the intelligent beam management process within the particular period of time is required.

Through this, the base station may reduce overhead by reducing an unnecessary base station beam measurement process with a low probability of actual use.

According to an embodiment, as shown in reference number 501, when a base station beam for measurement is set (e.g., the horizontal axis means a horizontal beam angle and the vertical axis means a vertical beam angle), the moving direction of the user equipment and information on previous measurement results are used to recognize that only base station beam measurement in a particular direction is required, and this is forwarded to the base station to change a measurement set used for measurement.

According to an embodiment, a method of forwarding recommended beam measurement set information to a base station by a user equipment may be a method in which the user equipment directly specifies a base station beam included in the recommended beam measurement set and forwards the same.

According to another embodiment, a user equipment may forward only characteristic information (e.g., angle) of a recommended beam and a base station may configure a measurement set based on the characteristic information.

When recommended beam measurement set configuration information is forwarded between the user equipment and the base station, information representing each beam may be represented in several forms. As a first form, a specific beam identifier (beam ID) is shared between the user equipment and the base station, the beam identifier may represent a measurement set. When the beam identifier is known, the beam measurement set may be represented in the form of a bitmap.

As a second form, a beam may be represented by an angle. A beam may be represented by an angle between a user equipment beam and a base station beam or an angle between boresight directions of the base station and the user equipment. Alternatively, without directly reporting beam measurement resource information to the base station, the user equipment may forward additional information (assistance information) for determining the beam measurement resource information. For example, the additional information may be an RSRP measurement value (or prediction value) for each base station beam or information on the accuracy of a measurement value (e.g., information on the size of an expected difference from the previous measurement value).

Figure 6:
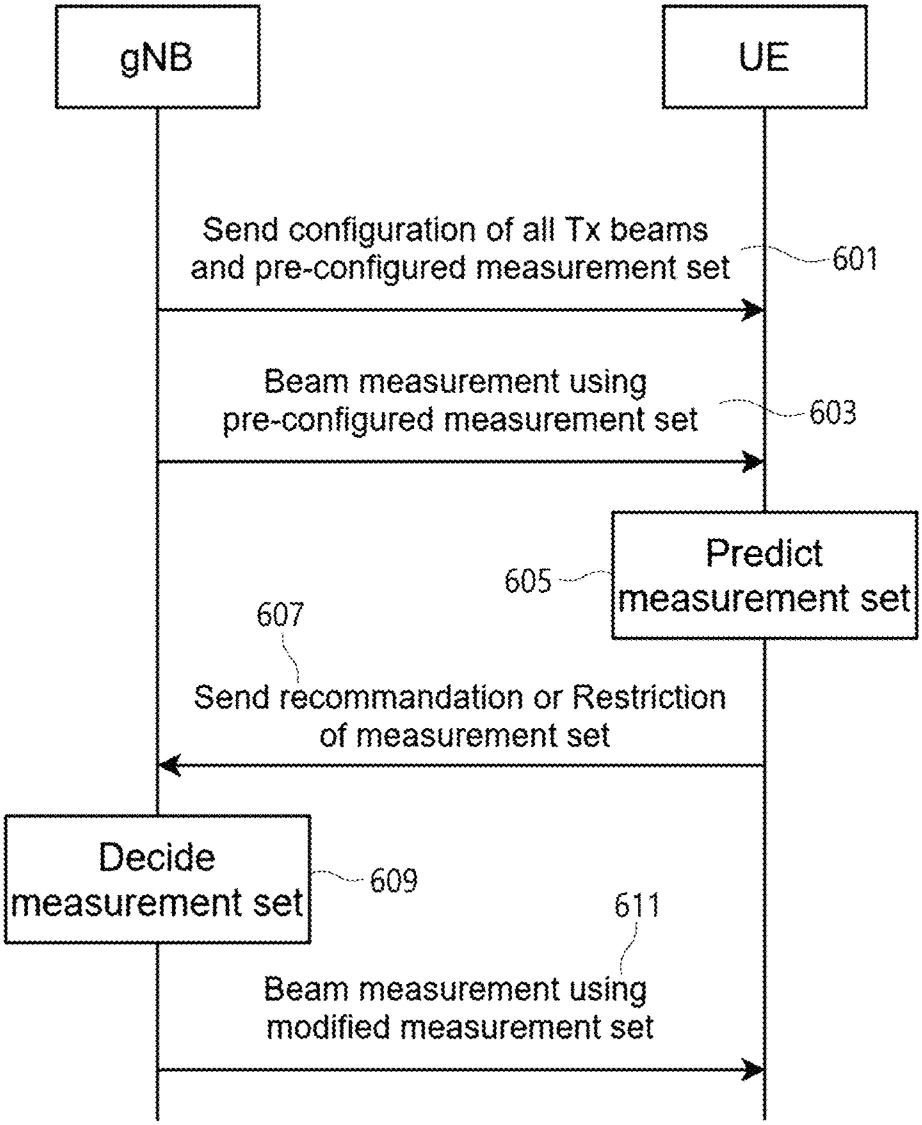
FIG. 6 shows an example of a process of forwarding base station beam measurement set information according to an embodiment of the present disclosure.

FIG. 6 shows an example of a process of forwarding base station beam measurement set information according to an embodiment of the present disclosure.

Referring to FIG. 6, a process for a user equipment to forward information to a base station in order to set a measurement set of base station beams shown in FIGS. 1 to 5 will be described in detail.

In step 601, the base station may forward, to the user equipment in advance, the configuration of a measurement set that includes base station beam entirety information used for beam measurement in the intelligent beam management technology.

In step 603, the base station may transmit information on beam measurement to the user equipment on the basis of the measurement set used in a beam management operation performed at a previous time.

In step 605, the user equipment may predict the measurement set on the basis of the information on beam measurement received from the base station.

In step 607, the user equipment may forward, on the basis of accumulated information on beam measurement, a recommended measurement set or a restricted measurement set to the base station. According to an embodiment, the recommended measurement set or the restricted measurement set may be forward to the base station in the form of a bitmap.

In step 609, the base station may refer to the information forwarded by the user equipment to determine a base station beam measurement set to be used in a future beam measurement process. In a process in which the base station finally determines a measurement set, a separate intelligent model (AI/ML model) different from in the beam selection process may be used to determine the measurement set. In this case, the information forwarded from the user equipment may be used as input to the intelligent model.

In step 611, the base station may transmit, on the basis of a modified measurement set, a beam measurement result to the user equipment.

In FIG. 6, the user equipment directly forwards recommended or restricted measurement set information to the base station. However, unlike FIG. 6, FIG. 7 shows the case in which only additional information is forwarded and the base station uses the additional information to directly generate a beam measurement set for use.

Figure 7:
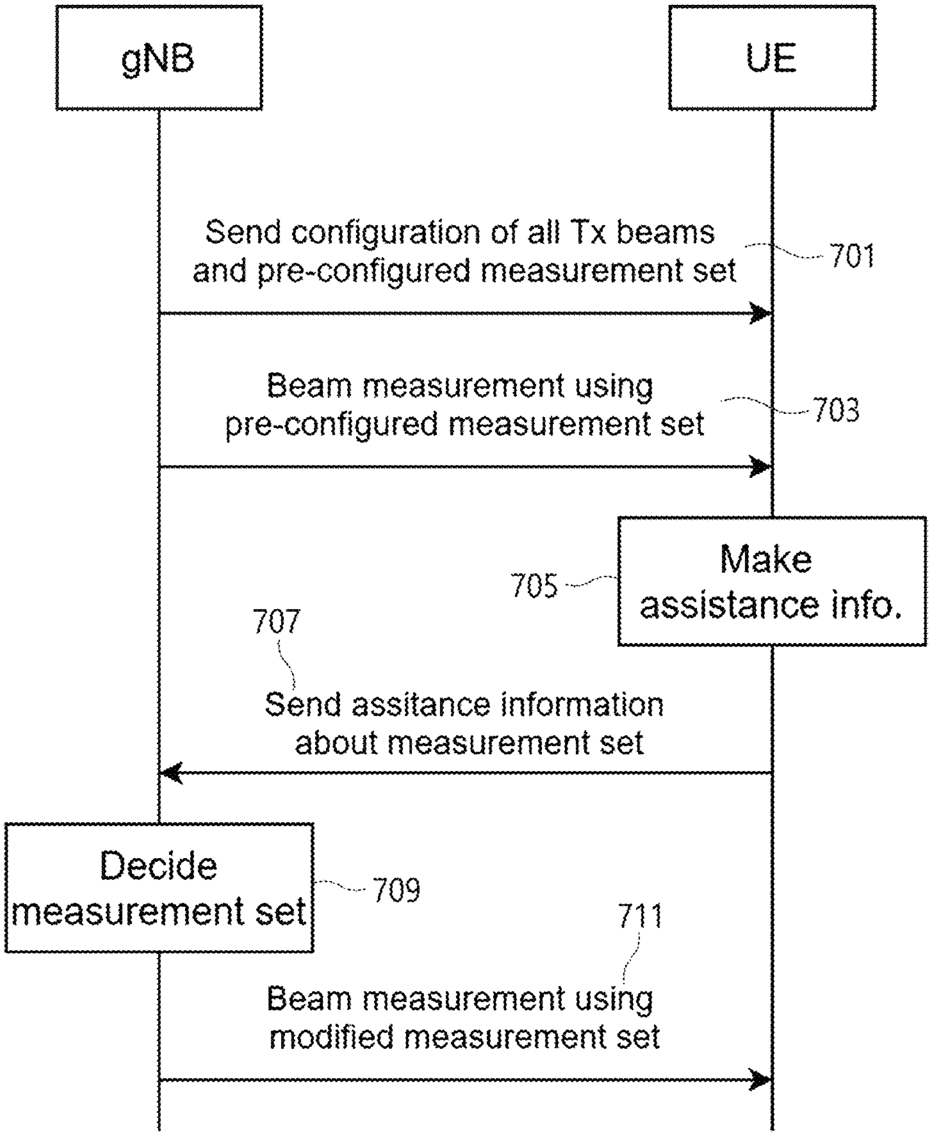
FIG. 7 shows another example of a process of forwarding base station beam measurement set information according to an embodiment of the present disclosure.

FIG. 7 shows another example of a process of forwarding base station beam measurement set information according to an embodiment of the present disclosure.

Referring to FIG. 7, a base station may transmit the configuration of all transmission beams (Tx beams) and a pre-configured measurement set to a user equipment in step 701. Herein, a bitmap representation of which beams among all available base station beams are selected as the measurement set may be transmitted to the user equipment.

The base station may transmit information on beam measurement to the user equipment by using the pre-configured measurement set. On the basis of this measurement result, a recommended measurement set may be selected in step 703.

The user equipment may generate additional information (assistance information) for the recommended measurement set on the basis of accumulated measurement information in step 705.

The user equipment may transmit the generated additional information to the base station in step 707. Herein, a recommended measurement set or a restricted measurement set may be represented in the form of a bitmap for transmission.

The base station may refer to the additional information received from the user equipment to determine a base station beam measurement set to be used in a future beam measurement process in step 709.

The user equipment may perform beam measurement using a modified measurement set based on the measurement set determined by the base station in step 711.

Specifically, the configuration of a base station beam measurement set may be pre-determined by the base station (gNB) or the network (network-side). The form of predetermined sets may be forwarded to the user equipment in advance during an access process. To this end, a bitmap representation of which base station beams among all available base station beam sets are selected as the measurement set may be forwarded to the user equipment. The user equipment may select, on the basis of accumulated measurement results, a recommended measurement set (assistance information) among forwarded measurement sets and may forward the recommended measurement set to the base station in step 711. Herein, the recommended measurement set or the restricted measurement set may be represented in the form of a bitmap for forwarding to the base station. The base station may refer to the information forwarded by the user equipment to determine a base station beam measurement set in a future base station beam measurement process.

Figure 8:
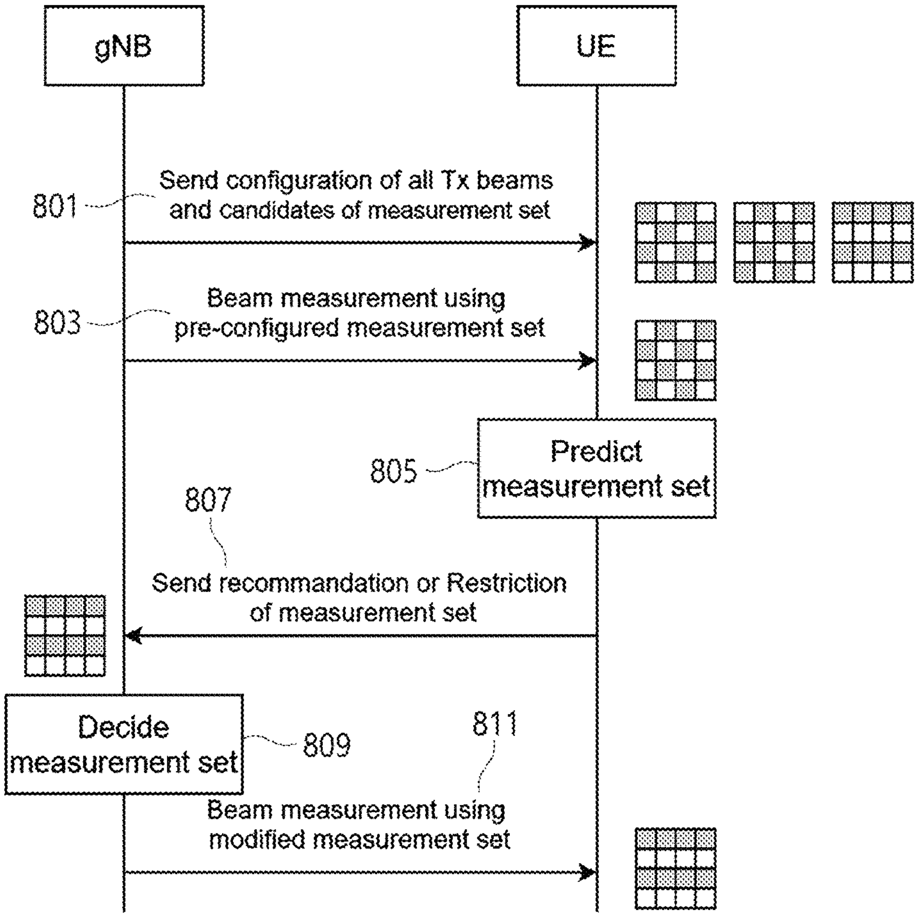
FIG. 8 shows still another example of a process of forwarding base station beam measurement set information according to an embodiment of the present disclosure.

FIG. 8 shows still another example of a process of forwarding base station beam measurement set information according to an embodiment of the present disclosure.

Referring to FIG. 8, a base station may transmit the configuration of all transmission beams (Tx beams) and measurement set candidates to a user equipment in step 801. This is to provide candidate sets that the user equipment can measure, enabling more flexible selection.

The base station may use a pre-configured measurement set to transmit information on beam measurement to the user equipment in step 803.

The user equipment may configure a measurement set predicted on the basis of information on initial beam measurement in step 805. Through this, the user equipment may select a more appropriate measurement set depending on a state. Specifically, in step 805, the pre-configured measurement set may be used to determine a plurality of beam sets on the basis of information on beam measurement, and one of the plurality of beam sets may be selected.

The user equipment may transmit, on the basis of the predicted measurement set, a recommended measurement set or a restricted measurement set information to the base station in step 807. The recommended measurement set or the restricted measurement set information may be represented in the form of a bitmap for transmission to the base station.

The base station may determine a final measurement set on the basis of the recommendation or restriction information received from the user equipment in step 809.

The base station may transmit, to the user equipment, a beam measurement result based on a modified measurement set in step 811.

That is, specifically, unlike FIG. 7, FIG. 8 shows another measurement set selection method in which instead of using a pre-configured base station beam measurement set, a new measurement set is configured depending on a state and used. In this case, the overhead may be further reduced by securing greater freedom of measurement set selection. The user equipment may use a bitmap form for each base station beam to directly specify base station beams that are recommended as or restricted to a measurement set.

Figure 9:
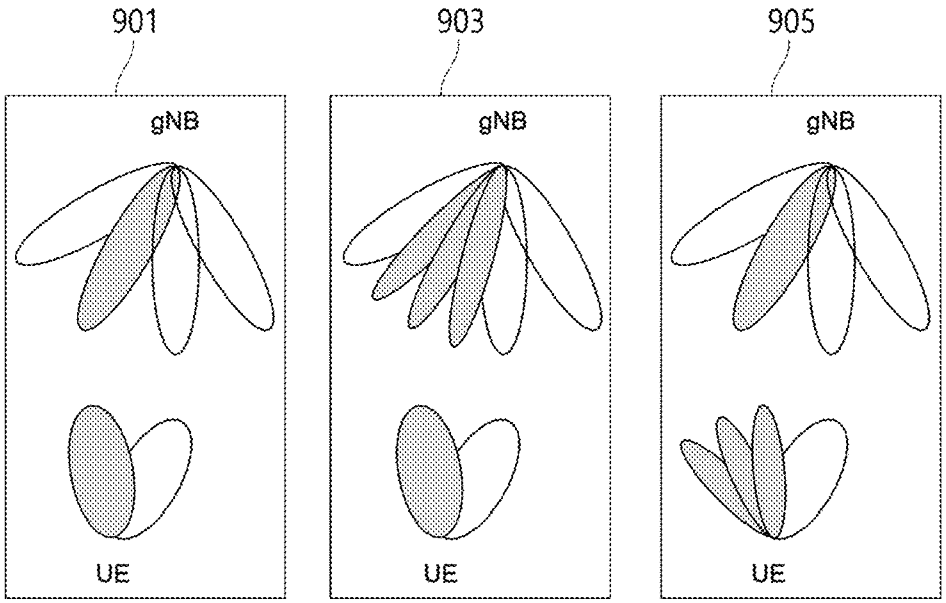
FIG. 9 shows an example of a beam pair selection process according to various embodiments of the present disclosure.

FIG. 9 shows an example of a beam pair selection process according to various embodiments of the present disclosure.

Referring to FIG. 9, FIG. 9 shows a process of determining a downlink beam pair in a conventional cellular wireless communication system. Beam selection is a process of selecting both a base station beam and a user equipment beam to generate one beam pair. In P1 process 901, sparse beams are used to measure the performance of the beams and a result of this is used to determine a coarse beam pair. In general, the P1 process occurs in an initial access process.

In P2 process 903, the base station finds a narrow base station beam for improvement. The user equipment beam selected in the P1 process is used as it is and narrow base station beams are used to measure (sweeping) performance and a beam is selected.

Conversely, in P3 process 905, the user equipment finds a narrow user equipment beam for improvement. In order to select a base station beam in the beam pair determination process, the user equipment needs to forward information on the measured beam performance to the base station. However, user equipment beam performance measurement can be performed by the user equipment itself, so the base station does not need to know user equipment beam-related information.

Figure 10:
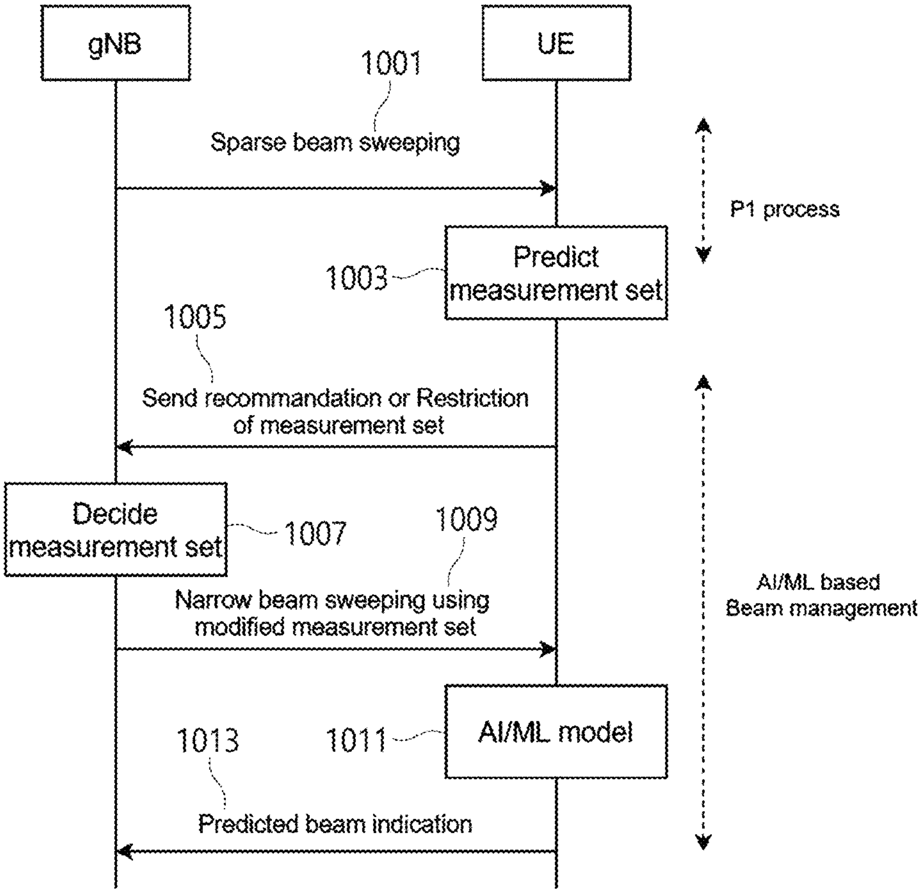
FIG. 10 shows an example of an intelligent beam management operation according to an embodiment of the present disclosure.

FIG. 10 shows an example of an intelligent beam management operation according to an embodiment of the present disclosure.

The intelligent beam management technology including the measurement set configuration method for beam selection described with reference to FIG. 9 may operate in conjunction with a conventional beam selection process.

In a first method, the P1 process for determining a coarse beam pair is performed identically, and then the intelligent beam management technology including the proposed measurement set configuration method replaces the P2 and P3 processes to operate in succession. This is specifically illustrated in FIG. 10.

Referring to FIG. 10, after performing the P1 process (sparse beam sweeping), the user equipment may forward measurement set preference information to the base station considering beam measurement information measured at the current point in time and previously stored information. The base station uses a measurement set selected by referring to the measurement set preference information to perform an intelligent beam management process, and the user equipment finally determines an optimal base station beam or beam pair using an intelligent model and forwards the optimal base station beam or beam pair to the base station.

Each step will be described in detail as follows.

The base station may perform initial beam sweeping on the user equipment in step 1001. In step 1001, several beams are searched and initial beam setting information is collected. In addition, the P1 process may be to determine a sparse beam pair.

The user equipment may predict a measurement set on the basis of a result of initial beam sweeping in step 1003. In step 1003, the measurement set may be predicted considering previously stored information and currently measured information. That is, the user equipment may forward predicted measurement set information to the base station. The predicted measurement set information may include a recommended measurement set of the user equipment.

The user equipment may transmit recommendation or restriction information on the predicted measurement set to the base station in step 1005. That is, the base station may determine a final measurement set on the basis of the recommendation or restriction information of the user equipment.

The base station may refer to the information received from the user equipment to determine the measurement set in step 1007. That is, the determined measurement set may be used to perform the intelligent beam management process.

The user equipment may perform narrow beam sweeping on the basis of a modified measurement set in step 1009. That is, an optimal beam pair may be selected through more precise beam measurement.

The user equipment may use an AI/ML model to predict an optimal base station beam or beam pair in step 1011. The AI/ML model may forward predicted information to the base station so that the base station can use optimal beam setting.

The user equipment may forward the beam information predicted using the AI/ML model to the base station in step 1013. Accordingly, the base station may apply optimal beam setting on the basis of the predicted beam information.

Figure 11:
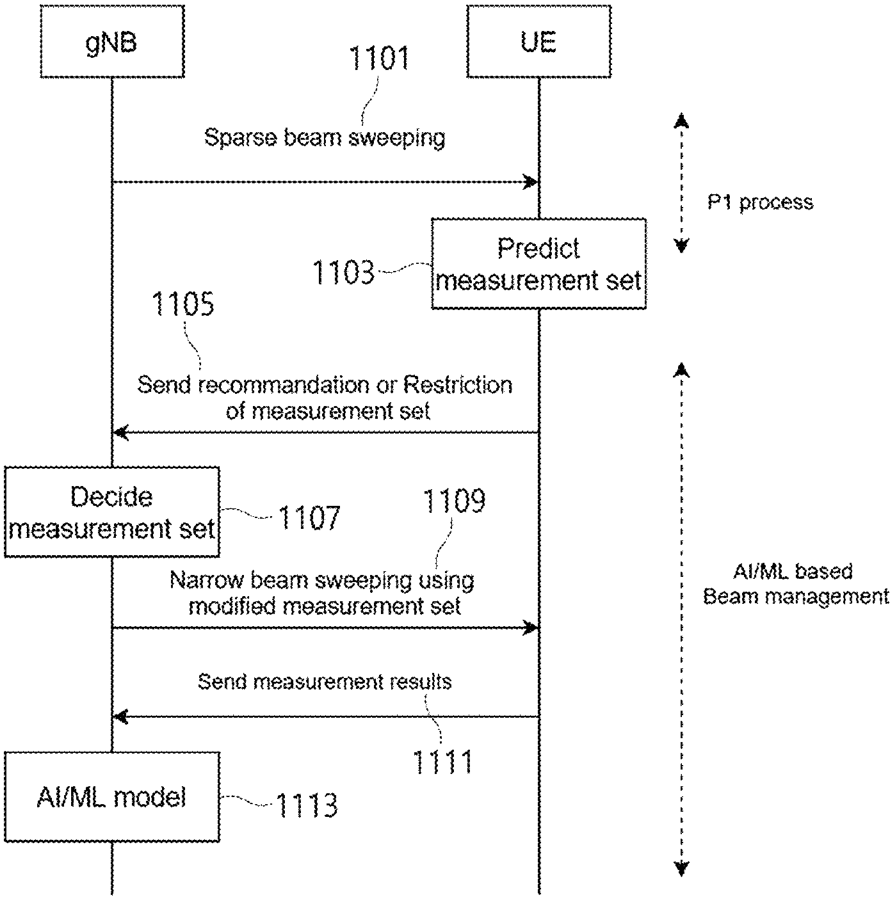
FIG. 11 shows another example of an intelligent beam management operation according to an embodiment of the present disclosure.

FIG. 11 shows another example of an intelligent beam management operation according to an embodiment of the present disclosure.

Referring to FIG. 11, when an intelligent model for determining a final base station beam or beam pair is located at a base station rather than a user equipment, a measurement result for a selected measurement set may be forwarded to the base station by the user equipment as shown in FIG. 11. The base station may use this information as input to finally determine an optimal base station beam or beam pair to be used.

Referring to FIG. 11, in general, the P1 process is performed using the SSB, and the subsequent processes are performed using the CSI-RS. Therefore, when several user equipments forward their recommended measurement set information to the base station, the base station may refer to the information to assign CSI-RS resource to each user equipment.

Specifically, each step of FIG. 11 will be described in detail as follows.

The base station may perform initial beam sweeping on the user equipment in step 1101. In step 1101, several beams are searched and initial beam setting information is collected. The P1 process may be to determine a sparse beam pair, and may be performed using the synchronization signal block (SSB) generally.

The user equipment may predict a measurement set on the basis of a result of initial beam sweeping and previously stored information in step 1103. The user equipment may forward predicted measurement set information to the base station. The predicted measurement set information may include recommended measurement set information of the user equipment.

The user equipment may transmit recommendation or restriction information on the predicted measurement set to the base station in step 1105. The base station may determine a final measurement set on the basis of the recommendation or restriction information of the user equipment.

The base station may refer to the information received from the user equipment to determine the measurement set in step 1107. That is, the determined measurement set may be used to perform the intelligent beam management process.

The user equipment may use a modified measurement set to perform narrow beam sweeping in step 1109. In general, the step 1109 may be performed using the Channel State Information Reference Signal (CSI-RS). That is, the step 1109 may be to select an optimal beam pair through more precise beam measurement.

The user equipment may transmit a result of beam sweeping to the base station in step 1111.

The base station may use an AI/ML model to predict and determine an optimal base station beam or beam pair in step 1113. According to an embodiment, the AI/ML model may determine optimal beam setting on the basis of a measurement result received from the user equipment.

Figure 12:
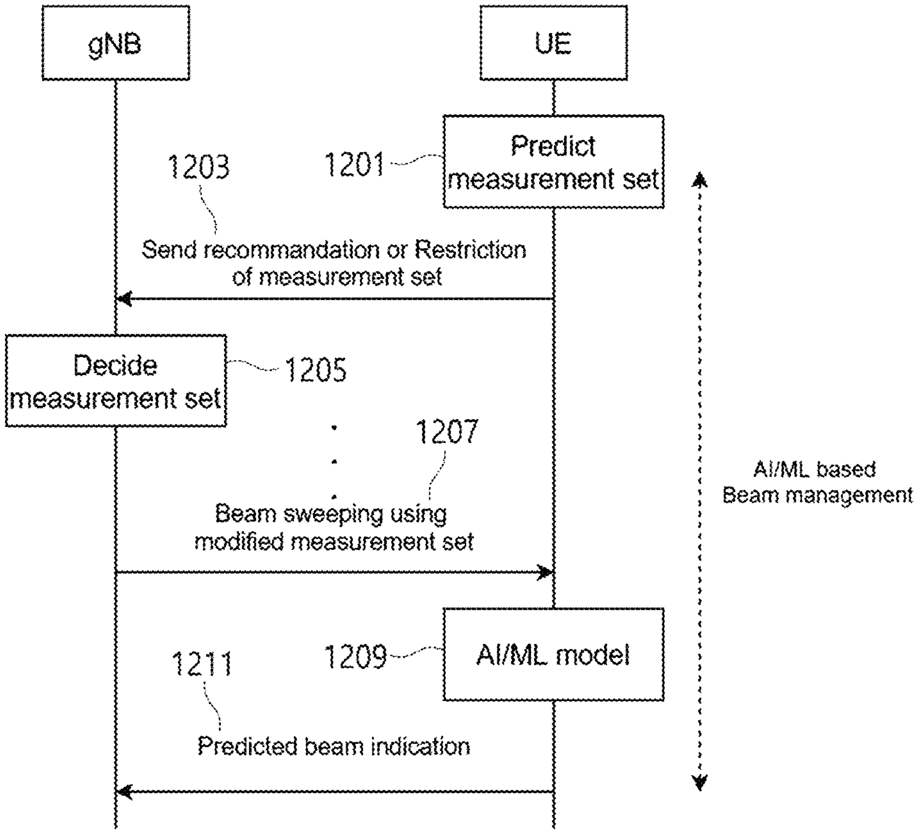
FIG. 12 shows still another example of an intelligent beam management operation according to an embodiment of the present disclosure.

FIG. 12 shows still another example of an intelligent beam management operation according to an embodiment of the present disclosure.

Referring to FIG. 12, FIG. 12 shows an intelligent beam management operation in which the intelligent beam management technology including the measurement set configuration method for beam selection replaces the conventional beam selection process altogether.

Referring to FIG. 12, at regular intervals or when a particular condition is satisfied, a user equipment may forward measurement set preference information to a base station considering previous beam measurement information. The base station refers to the information to perform an intelligent beam management process, and the user equipment finally determines an optimal beam pair by using an intelligent model. In this case, a measurement set configuration process and a process of determining an optimal base station beam or beam pair by the intelligent model may not be continuous. That is, the measurement set configuration process may be performed on demand, rather than each time a beam is determined.

Each step shown in FIG. 12 will be described in detail as follows.

The base station may perform initial beam sweeping on the user equipment in step 1201. In step 1201, several beams are searched and initial beam setting information is collected. The P1 process may be to determine a sparse beam pair, and may be performed using the SSB generally.

The user equipment may predict a measurement set on the basis of a result of initial beam sweeping and previously stored information in step 1203. The user equipment may forward predicted measurement set information to the base station. The information may include recommended measurement set information of the user equipment.

The user equipment may transmit recommendation or restriction information on the predicted measurement set to the base station in step 1205. The base station may determine a final measurement set on the basis of the recommendation or restriction information of the user equipment.

The base station may determine the measurement set on the basis of the information received from the user equipment in step 1207. The determined measurement set may be used to perform the intelligent beam management process.

The user equipment may use a modified measurement set to perform narrow beam sweeping in step 1209. According to an embodiment, the step 1209 may be performed using the CSI-RS. Through the step 1209, the user equipment may select an optimal beam pair through more precise beam measurement.

The user equipment may transmit a result of beam sweeping to the base station in step 1211. The base station may use a measurement result received from the user equipment as input.

The base station may use an AI/ML model to predict and determine an optimal base station beam or beam pair in step 1213. According to an embodiment, the AI/ML model may determine optimal beam setting on the basis of a measurement result received from the user equipment.

Figure 13:
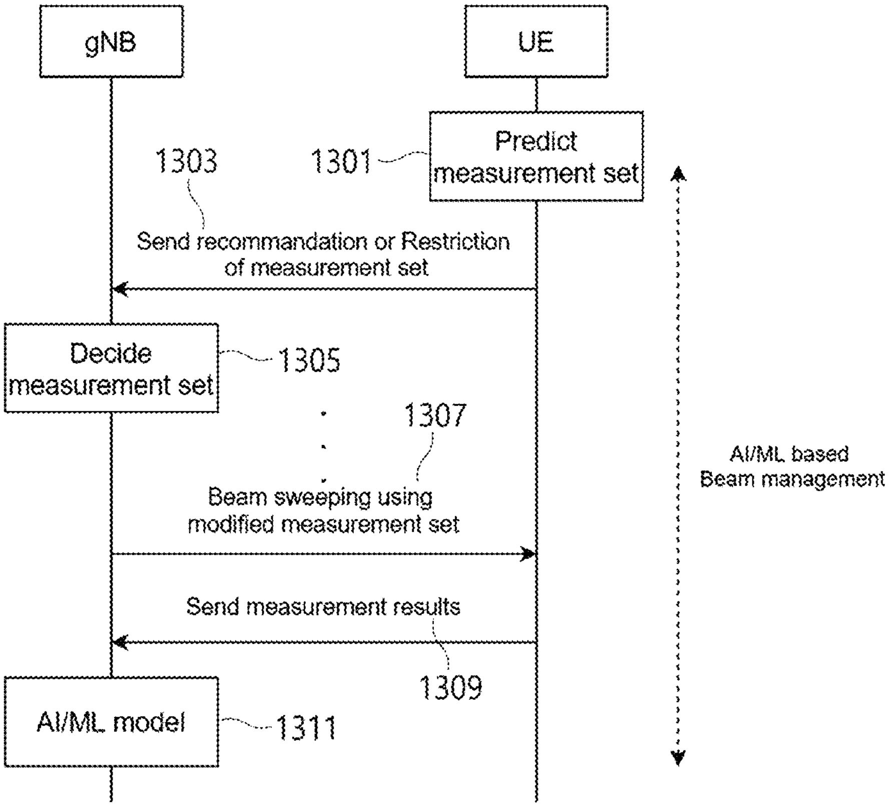
FIG. 13 shows still another example of an intelligent beam management operation performed by a base station according to an embodiment of the present disclosure.

FIG. 13 shows still another example of an intelligent beam management operation performed by a base station according to an embodiment of the present disclosure.

In FIG. 13, unlike FIG. 12, a user equipment transmits a measurement result to a base station and the base station uses the measurement result to directly perform an intelligent beam management operation.

The user equipment may predict a measurement set on the basis of a current state and previously stored information in step 1301. The user equipment may forward predicted measurement set information to the base station. The information may include recommended measurement set information of the user equipment.

The user equipment may transmit recommendation or restriction information on the predicted measurement set to the base station in step 1303. The base station may determine a final measurement set on the basis of the recommendation or restriction information of the user equipment.

The base station may refer to the information received from the user equipment to determine the measurement set in step 1305. The base station may use the determined measurement set to perform beam sweeping.

The user equipment may perform beam sweeping using a modified measurement set determined by the base station in step 1307. In step 1307, the user equipment may search several beams according to a measurement set. Through this, the user equipment may select an optimal beam pair through more precise beam measurement.

The user equipment may transmit a result of beam sweeping to the base station in step 1309. The base station may use a measurement result received from the user equipment as input.

The base station may use an AI/ML model to predict and determine an optimal base station beam or beam pair in step 1311. According to an embodiment, the AI/ML model may determine optimal beam setting on the basis of a measurement result received from the user equipment.

Figure 14:
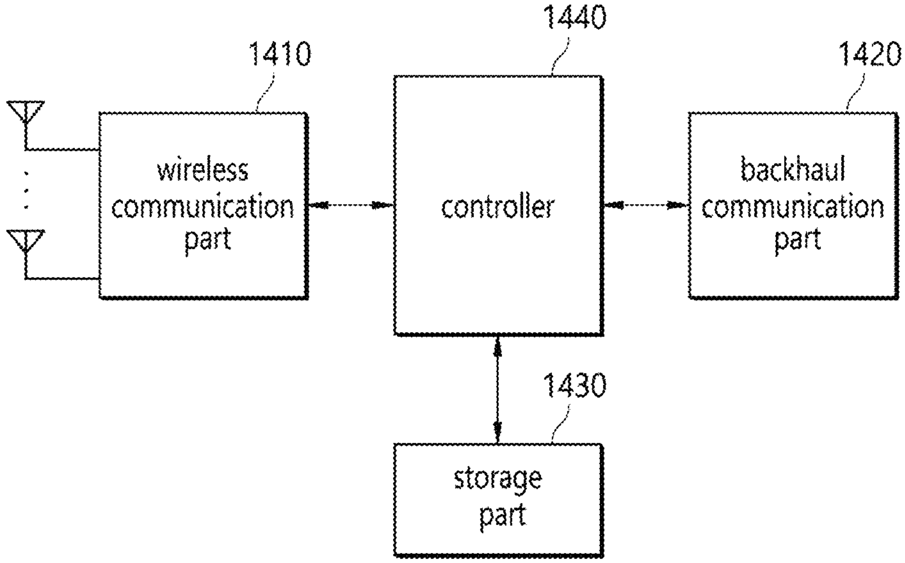
FIG. 14 shows a configuration diagram of a base station in a wireless communication system according to various embodiments of the present disclosure.

FIG. 14 shows a configuration diagram of a base station in a wireless communication system according to various embodiments of the present disclosure. The configuration illustrated in FIG. 14 may be understood as a configuration of a base station. The terms "~part", "~unit", and the like used below mean a unit for processing at least one function or operation, and may be implemented by hardware, software, or a combination of hardware and software.

Referring to FIG. 14, a base station may include a wireless communication part 1410, a backhaul communication part 1420, a storage part 1430, and a controller 1440.

The wireless communication part 1410 may transmit and receive wireless signals through a wireless channel. For example, the wireless communication part 1410 may perform a function of conversion between a baseband signal and a bit string according to the physical layer standards of a system. In addition, when transmitting data, the wireless communication part 1410 may generate complex symbols by encoding and modulating a transmission bit string. When receiving data, the wireless communication part 1410 may restore a reception bit string by demodulating and decoding a baseband signal.

In addition, the wireless communication part 1410 may up-convert a baseband signal into an RF band signal and transmit the RF band signal through an antenna, and may down-convert an RF band signal received through an antenna into a baseband signal. To this end, the wireless communication part 1410 may include a transmission filter, a reception filter, an amplifier, a mixer, an oscillator, a digital-to-analog converter (DAC), and an analog-to-digital converter (ADC).

The wireless communication part 1410 may include multiple transmission and reception paths. The wireless communication part 1410 may include at least one antenna array composed of multiple antenna elements.

In terms of hardware, the wireless communication part 1410 may include a digital unit and an analog unit. The analog unit may include multiple sub-units according to operating power or operating frequency. The digital unit may be realized as at least one processor (e.g., digital signal processor (DSP)).

The wireless communication part 1410 may transmit and receive wireless signals as described above. Accordingly, all or part of the wireless communication part 1410 may be referred to as a "transmitter", "receiver", or "transceiver". In addition, in the following description, transmission and reception performed through a wireless channel may include the above-described processing performed by the wireless communication part 1410.

The backhaul communication part 1420 may provide an interface for performing communication with other nodes in the network. That is, the backhaul communication part 1420 may convert bit strings transmitted from the base station to other nodes, such as other access nodes, other base stations, a parent node, and a core network, into physical signals, and may convert physical signals received from other nodes into bit strings.

The storage part 1430 may store therein data, such as default programs, application programs, and setting information for the operation of the base station. The storage part 1430 may be a volatile memory, a non-volatile memory, or a combination of a volatile memory and a non-volatile memory. In addition, the storage part 1430 may provide stored data according to a request of the controller 1440.

The controller 1440 may control overall operations of the base station. For example, the controller 1440 may transmit and receive signals through the wireless communication part 1410 or the backhaul communication part 1420. In addition, the controller 1440 may record data on the storage part 1430 and may read the data. In addition, the controller 1440 may perform functions of a protocol stack that communication standards require.

To this end, the controller 1440 may include at least one processor.

According to various embodiments of the present disclosure, the controller 1440 may perform control so that the base station performs the operations according to the various embodiments described with reference to FIGS. 1 to 13.

Figure 15:
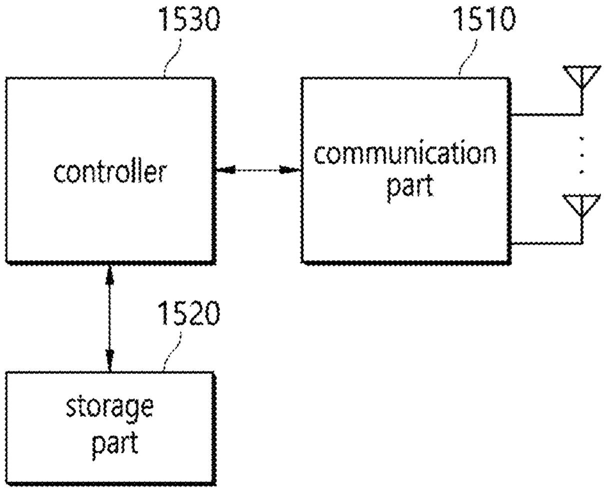
FIG. 15 shows a configuration diagram of a user equipment in a wireless communication system according to various embodiments of the present disclosure.

FIG. 15 shows a configuration diagram of a user equipment in a wireless communication system according to various embodiments of the present disclosure. The configuration illustrated in FIG. 15 may be understood as a configuration of a user equipment. The terms "~part", "~unit", and the like used below mean a unit for processing at least one function or operation, and may be implemented by hardware, software, or a combination of hardware and software.

Referring to FIG. 15, a user equipment may include a communication part 1510, a storage part 1520, and a controller 1530.

The communication part 1510 may perform functions for transmitting and receiving signals through a wireless channel. For example, the communication part 1510 may perform a function of conversion between a baseband signal and a bit string according to the physical layer standards of a system. For example, when transmitting data, the communication part 1510 may generate complex symbols by encoding and modulating a transmission bit string. When receiving data, the communication part 1510 may restore a reception bit string by demodulating and decoding a baseband signal. In addition, the communication part 1510 may up-convert a baseband signal into an RF band signal and transmit the RF band signal through an antenna, and may down-convert an RF band signal received through an antenna into a baseband signal. For example, the communication part 1510 may include a transmission filter, a reception filter, an amplifier, a mixer, an oscillator, a DAC, and an ADC.

In addition, the communication part 1510 may include multiple transmission and reception paths. Furthermore, the communication part 1510 may include at least one antenna array composed of multiple antenna elements. In terms of hardware, the communication part 1510 may be a digital circuit and an analog circuit (for example, a radio frequency integrated circuit (RFIC)). Herein, the digital circuit and the analog circuit may be realized as one package. In addition, the communication part 1510 may include multiple RF chains. Furthermore, the communication part 1510 may perform beamforming.

The communication part 1510 transmits and receives signals as described above. Accordingly, all or part of the communication part 1510 may be referred to as a "transmitter", "receiver", or "transceiver". In addition, in the following description, transmission and reception performed through a wireless channel may be used to mean that the communication part 1510 performs the above-described processing.

The storage part 1520 may store therein data, such as default programs, application programs, and setting information for the operation of the user equipment. The storage part 1520 may be a volatile memory, a non-volatile memory, or a combination of a volatile memory and a non-volatile memory. In addition, the storage part 1520 may provide stored data according to a request of the controller 1530.

The controller 1530 may control overall operations of the user equipment. For example, the controller 1530 may transmit and receive signals through the communication part 1510. In addition, the controller 1530 may record data on the storage part 1520 and may read the data. The controller 1530 may perform functions of a protocol stack that communication standards require. To this end, the controller 1530 may include at least one processor or microprocessor, or may be part of a processor. In addition, part of the communication part 1510 and the controller 1530 may be referred to as a communication processor (CP).

According to various embodiments, the controller 1530 may perform control so that the user equipment performs the operations according to the various embodiments described with reference to FIGS. 1 to 12.

Methods according to the embodiments described in the claims of the present disclosure or in the specification may be implemented in the form of hardware, software, or a combination of hardware and software.

In the case of software implementation, a computer-readable storage medium in which at least one program (software module) is stored may be provided. The at least one program stored in the computer-readable storage medium is configured to be executable by at least one processor in an electronic device. The at least one program includes instructions for the electronic device to execute the methods according to the embodiments described in the claims of the present disclosure or the specification.

The program (software module or software) may be stored in non-volatile memory including random-access memory and flash memory, read-only memory (ROM), electrically erasable programmable read-only memory (EEPROM), a magnetic disc storage device, a compact disc-ROM (CD-ROM), digital versatile discs (DVDs), optical storage devices of other types, or a magnetic cassette. Alternatively, the program may be stored in a memory composed of a combination of some or all of these memories. In addition, a plurality of such memories may be included.

In addition, the program may be stored in an attachable storage device that is accessible through a communication network, such as the Internet, Intranet, a local area network (LAN), a wide area network (WAN), or a storage area network (SAN), or a combination thereof. The storage device may be connected through an external port to an apparatus performing an embodiment of the present disclosure. In addition, a separate storage device on the communication network may be connected to the apparatus performing an embodiment of the present disclosure.

In the above-described detailed embodiments of the disclosure, an element included in the disclosure is expressed in the singular or the plural according to a presented detailed embodiment. However, the singular form or plural form is selected suitable for the presented situation for convenience of description, and the various embodiments of the disclosure are not limited to a single element or multiple elements thereof. Further, either multiple elements expressed in the description may be configured into a single element or a single element in the description may be configured into multiple elements.

Although the specific embodiments have been described in the detailed description of the present disclosure, various modifications and changes may be made thereto without departing from the scope of the present disclosure. Therefore, the scope of the present disclosure should not be defined as being limited to the embodiments, but should be defined by the appended claims and equivalents thereof.

What is claimed is:

1. An operation method of a user equipment (UE) in a wireless communication system, the operation method comprising:

receiving, from a base station (BS), configuration of a measurement set including beam entirety information of the base station used in beam measurement;

receiving information on beam measurement from the base station;

predicting the measurement set on the basis of the information on beam measurement;

transmitting information on a recommended measurement set or a restricted measurement set to the base station, and receiving a beam measurement result based on a modified measurement set from the base station.

2. The operation method of claim 1, wherein at least one of the information on the recommended measurement set or the restricted measurement set is in a bitmap form.

3. The operation method of claim 1, wherein the predicting of the measurement set on the basis of the information on beam measurement comprises selecting one beam set among a plurality of beam sets on the basis of the information on beam measurement by using a pre-configured measurement set.

4. The operation method of claim 1, further comprising:

receiving configuration of all transmission beams and a pre-configured measurement set from the base station.

5. The operation method of claim 4, further comprising:

receiving the information on beam measurement from the base station by using the pre-configured measurement set.

6. The operation method of claim 5, further comprising:

accumulating the information on beam measurement to generate additional information for the measurement set; and determining, on the basis of the additional information, a beam measurement set to be used in future beam measurement.

7. An operation method of a base station (BS) in a wireless communication system, the operation method comprising:

transmitting, to a user equipment (UE), configuration of a measurement set including beam entirety information of the base station used in beam measurement;

transmitting, to the user equipment, information on beam measurement on the basis of the measurement set used in a beam management operation performed at a previous time;

receiving, from the user equipment, information on a recommended measurement set or a restricted measurement set on the basis of the information on beam measurement, determining, on the basis of the information on the recommended measurement set or the restricted measurement set, a beam measurement set to be used in future beam measurement; and transmitting a beam measurement result based on the determined beam measurement set to the user equipment.

8. The operation method of claim 7, wherein at least one of the information on the recommended measurement set or the restricted measurement set is in a bitmap form.

9. The operation method of claim 7, further comprising: transmitting configuration of all transmission beams and a pre-configured measurement set to the user equipment.

10. The operation method of claim 8, further comprising: transmitting the information on beam measurement to the user equipment by using a pre-configured measurement set.

11. The operation method of claim 10, further comprising performing beam measurement on the basis of the beam measurement set determined on the basis of additional information, wherein the additional information for the measurement set is generated by accumulating the information on beam measurement, and the beam measurement set to be used in future beam measurement is determined on the basis of the additional information.

12. A user equipment (UE) in a wireless communication system, comprising:

at least one transceiver; and at least one controller operably connected to the at least one transceiver, wherein the at least one controller is configured to receive, from a base station (BS), configuration of a measurement set including beam entirety information of the base station used in beam measurement, receive information on beam measurement from the base station, predict the measurement set on the basis of the information on beam measurement, transmit information on a recommended measurement set or a restricted measurement set to the base station, and receive a beam measurement result based on a modified measurement set from the base station.

13. The user equipment of claim 12, wherein at least one of the information on the recommended measurement set or the restricted measurement set is in a bitmap form.

14. The user equipment of claim 12, wherein the at least one controller is configured to, to predict the measurement set on the basis of the information on beam measurement, select one beam set among a plurality of beam sets on the basis of the information on beam measurement by using a pre-configured measurement set.

15. The user equipment of claim 14, wherein the at least one controller is configured to receive configuration of all transmission beams and the pre-configured measurement set from the base station.

16. The user equipment of claim 15, wherein the at least one controller is configured to receive the information on beam measurement from the base station by using the pre-configured measurement set.

17. The user equipment of claim 16, wherein the at least one controller is configured to accumulate the information on beam measurement to generate additional information for the measurement set, and determine, on the basis of the additional information, a beam measurement set to be used in future beam measurement.

* * * * *